UNITED STATES PATENT OFFICE.

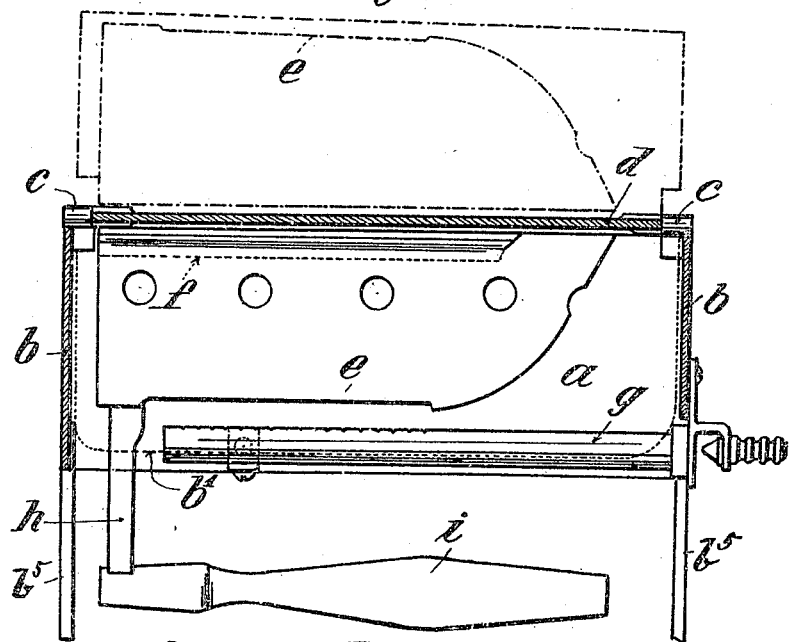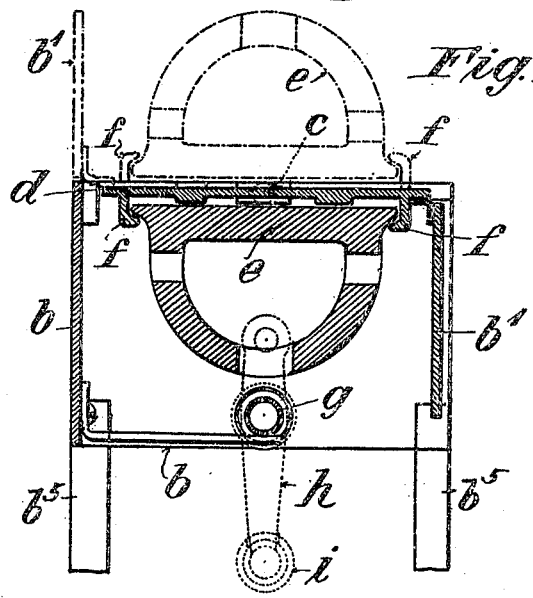

FERDINAND SCHITKA, OF VIENNA, AUSTRIA-HUNGARY, ASSIGNOR OF ONE-HALF TO WLADISLAW KOLISCHER, OF VIENNA, AUSTRIA-HUNGARY.

APPARATUS FOR HEATING FLAT-IRONS.

959,616.          Specification of Letters Patent.      Patented May 31, 1910.

Application filed February 2, 1910. Serial No. 541,536.

*To all whom it may concern:*

Be it known that I, FERDINAND SCHITKA, a citizen of Austria, and resident of Vienna, Lower Austria, and Empire of Austria-Hungary, have invented certain new and useful Improvements in Apparatus for Heating Flat-Irons, of which the following is a specification.

This invention relates to apparatus for heating flat irons and more particularly to such heaters consuming gaseous or liquid fuel in which the flat iron to be heated is held in position by a supporting plate journaled turnably in the top of the heating chamber in such a manner, that for the purpose of heating the flat iron the same can be brought in the closed heating chamber by turning the movable supporting plate. The heating apparatus hitherto constructed for this purpose is usable only for heating flat irons having a detachable handle because, on the one hand, the arrangement of the several parts does not allow the inserting and the removal of the flat irons, while on the other hand there is a danger of ignition of the handle made of wood.

The object of this invention allows not only to heat flat irons having a detachable handle but also flat irons having a handle fixed thereon—the latter being preferred in many cases in view of the greater security and greater convenience in using the flat irons—without any necessity of making voluminous heating chambers required by the handle and without any inconvenience in using the apparatus. To obtain this purpose one of the side walls surrounding the heating chamber is fixed on or made in one piece with the turnable supporting plate supporting the flat iron and the burner is disposed in the heating chamber in such a manner that by turning the flat iron downward into the heating chamber the burner comes to be in position between the flat iron and the handle of the latter.

An embodiment of the invention is shown on the accompanying drawing in which—

Figure 1 is a vertical longitudinal section and Fig. 2 a vertical cross section of the apparatus; in both figures there are shown the downward turned position of the supporting plate in full lines and the upward turned position in dotted lines.

The heating chamber $a$ is surrounded by the casing $b$ supported by feet $b^5$ and is covered with a plate $d$ supporting the flat iron $e$ to be heated and being journaled turnably by pivots $c$; the supporting plate is furnished with fastening ribs $f$ or grooves for securing the flat iron up to the supporting plate.

One of the longitudinal side walls $b^1$ of the casing $b$ forming the heating chamber is not connected with the adjacent cross walls but is secured to or made in one piece with the turnable supporting plate $d$ in such a manner, that by turning the supporting plate the annexed wall $b^1$ is also turned upward or downward.

The heating device $g$, (in the illustrated embodiment a tubular gas burner,) does not extend the whole length of the heating chamber but terminates a distance from the respective cross wall of the casing for the purpose of obtaining a space for passing the bridge $h$ of the handle of the flat iron if the supporting plate is turned. By this the flat iron can be brought into a strictly vertical position above the burner $g$. The handle $i$ of the flat iron comes into a position below the burner $g$ and is therefore not subjected to the influence of heat radiated by the burner.

For the removing of the heated flat iron the handle of same is turned in a semicircle from below to above whereby the supporting plate is also turned 180 degrees. By this turning of the supporting plate the flat iron is brought up to the upper side of the casing and can be removed from the ribs or grooves.

What I claim is:

In an apparatus for heating flat irons the combination of a heating chamber surrounded by side walls and covered by a turnable supporting plate having ribs or grooves for fastening the flat iron to be heated, one side wall of the casing being secured to the supporting plate and a heating device arranged in such a manner that by turning the supporting plate the bridge of the handle of the flat iron passes between the end of the heating device and the opposite cross wall of the heating chamber, substantially as set forth.

Signed at Vienna Lower Austria and Empire of Austria-Hungary this 21st day of January A. D. 1910.

FERDINAND SCHITKA.

Witnesses:
     WILHELM BERGER,
     AUGUST FUGGER.